Oct. 5, 1943.  A. H. KIRKSEY  2,330,897
TRUCK AND TRAILER APPARATUS
Filed Sept. 21, 1940  4 Sheets-Sheet 1

Inventor
AMOS H. KIRKSEY,
By Lyon & Lyon
Attorney

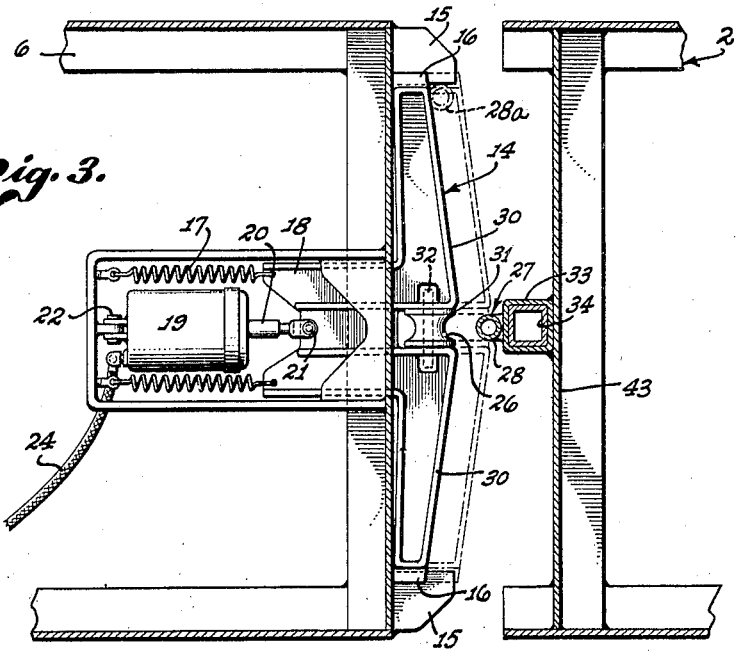
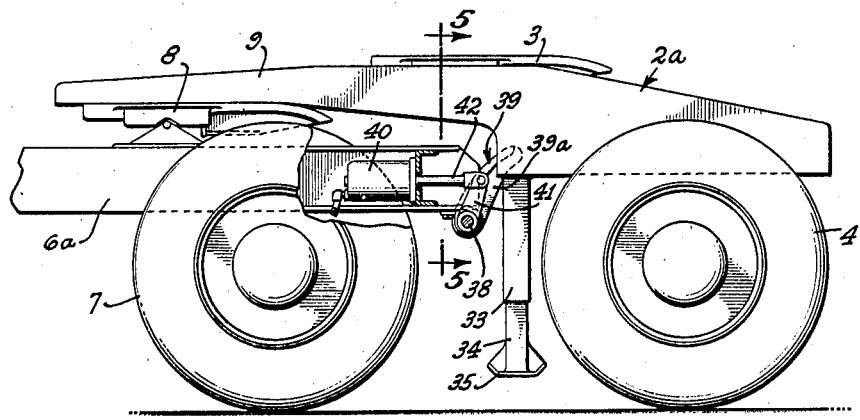
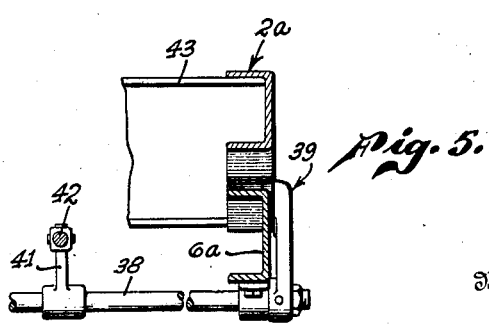

Oct. 5, 1943.  A. H. KIRKSEY  2,330,897
TRUCK AND TRAILER APPARATUS
Filed Sept. 21, 1940  4 Sheets-Sheet 3

Inventor
AMOS H. KIRKSEY,
By Lyon & Lyon
Attorney

Oct. 5, 1943.   A. H. KIRKSEY   2,330,897
TRUCK AND TRAILER APPARATUS
Filed Sept. 21, 1940   4 Sheets-Sheet 4

Inventor
AMOS H. KIRKSEY,
By Lyon & Lyon
Attorney

Patented Oct. 5, 1943

2,330,897

UNITED STATES PATENT OFFICE 2,330,897

TRUCK AND TRAILER APPARATUS

Amos Harrold Kirksey, Vernon, Calif.

Application September 21, 1940, Serial No. 357,771

12 Claims. (Cl. 280—33.1)

This invention relates to trucks and trailer apparatus, and while the invention is applicable to a common type of truck, it can also be applied to trucks of semi-trailer type. In this latter type of apparatus the trailer body has a forward truck with wheels, connected by a fifth wheel to the truck body, and this forward truck frame is so constructed that a vehicle such as a power-driven truck or tractor, can be backed under it. The power-driven vehicle is provided with a fifth wheel which automatically connects itself up to the forward end of the forward truck of the trailer. This construction, involving two fifth wheels, operates satisfactorily while the truck and trailer are running forward on a roadway, but renders it almost impossible for the vehicle and trailer to be backed. When it is attempted to back a truck, it is difficult to keep the back end of the truck in line on account of a tendency to rotate on the axis of the fifth wheel of the truck. One of the objects of this invention is to provide means for overcoming this difficulty in a truck of regular type, or of the semi-trailer type referred to above.

Another object of this invention is to provide apparatus of this kind with means for enabling two such fifth wheels to be employed, but so constructed that when the vehicle is connected to the trailer, the rear end of the vehicle can be locked to the forward truck of the trailer so as to inhibit the operation of the forward fifth wheel, but leaving the fifth wheel between the trailer body and its own forward truck in operation.

In this type of truck and trailer, the fifth wheel between the forward truck of the trailer and the trailer body, should be located substantially midway between the wheels of the forward truck and the rear wheels of the vehicle to which the trailer is attached. This enables the weight to be properly distributed on the adjacent wheels.

Another object of this invention is to provide a mounting for this fifth wheel, which will enable it to be adjusted into mid position between the wheels forward of it, and the wheels directly behind it.

A further object of the invention is to provide means for interlocking the rear end of the vehicle frame to the forward truck of the trailer, regardless of whether the forward vehicle and the forward truck of the trailer are exactly in line with each other. In other words, to provide a construction whereby the interlocking mechanism can be set ready to interlock so that as soon as the vehicle moves forward and the trailer body straightens out behind it, the interlocking connection will be effected.

A further object of the invention is to provide for effecting this interlocking connection between the rear end of the vehicle and the forward truck of the trailer, regardless of whether the wheels of the vehicle are at a lower or higher level than the wheels of the forward truck of the trailer.

A further object of the invention is to provide interlocking means between the rear end of the vehicle and the forward truck of the trailer, that will permit perfect freedom of relative movement of the forward truck and the rear end of the vehicle in a vertical plane. In other words, to provide a construction which will enable the wheels of the forward truck and the wheels of the vehicle to adapt themselves to different road levels.

In the preferred embodiment of the invention, the forward truck of the trailer is provided with a bracket that presents a quadrant or guide bow disposed in a substantially vertical plane, for engagement with means carried by the rear end of the vehicle frame. This quadrant is employed so as to enable the interlocking connection to be maintained between the rear end of the towing vehicle and the forward truck of the trailer on a rough road, and regardless of the wheel levels. One of the objects of this invention is to provide simple means associated with this bracket for supporting the forward truck of the trailer in an upright position when the towing vehicle is disconnected from the forward truck of the trailer.

Further objects of the invention will appear hereinafter.

The invention consists in the novel parts and combination of parts to be described hereinafter, all of which contribute to produce an efficient truck and trailer apparatus.

A preferred embodiment of the invention is described in the following specification, while the broad scope of the invention is pointed out in the appended claims.

In the drawings:

Fig. 3 is a plan section taken about on the line 3—3 of Fig. 2, with the forward portion of the towing vehicle broken away, and the rear portion of the frame of the forward truck of the trailer also broken away. While Figs. 1 and 2 show the interlocking connection out of use, Fig. 3 shows the interlocking connection in dotted lines in its operative position.

Fig. 4 is a view similar to Fig. 2, but upon a reduced scale, but illustrating another embodiment of the interlocking mechanism for holding the forward truck of the vehicle against lateral shifting on the axis of the forward fifth wheel.

Fig. 5 is a vertical section taken on the line 5—5 of Fig. 4, at the left side and looking rearwardly.

Figures 1, 2:
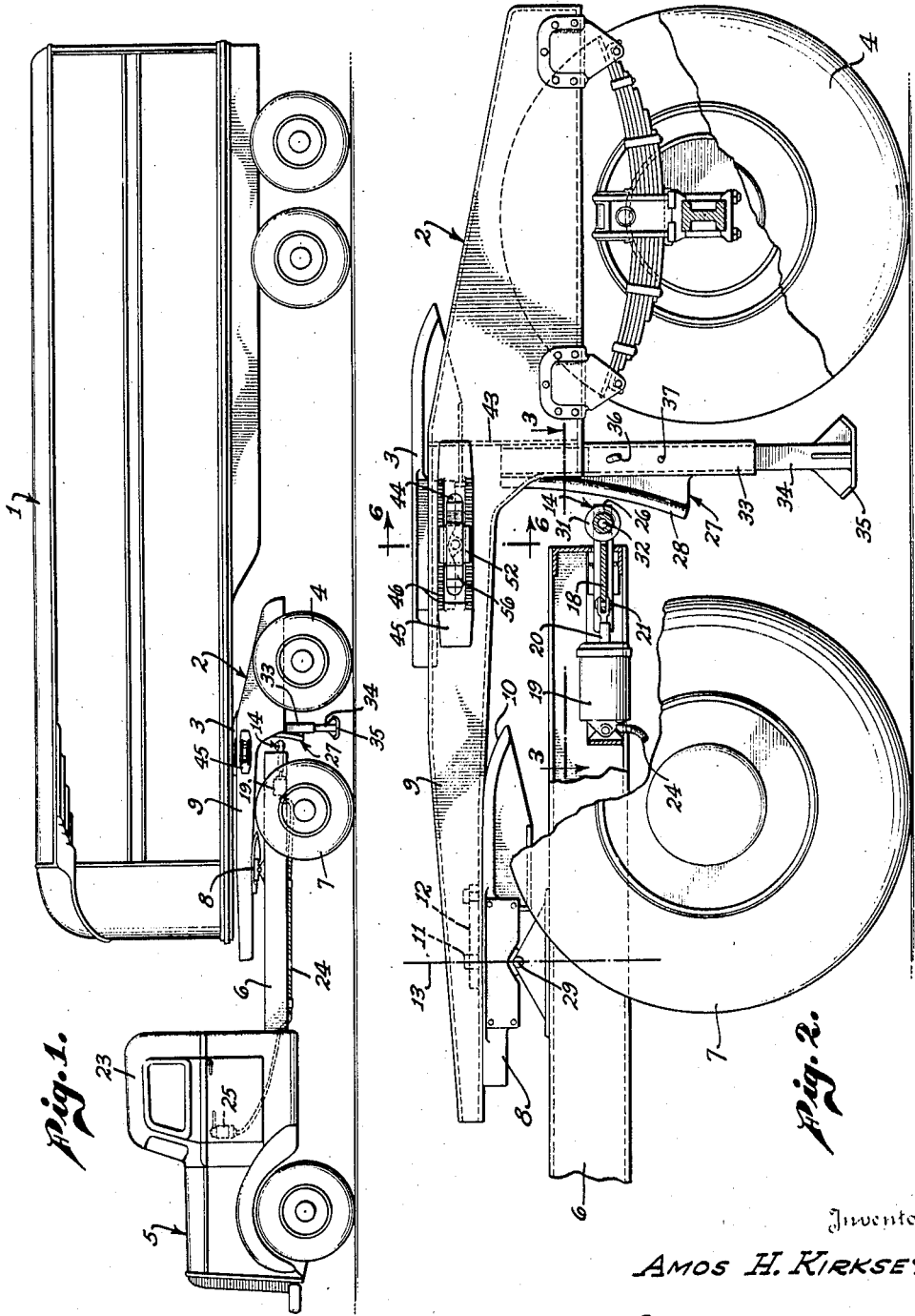
Fig. 1 is a side elevation of a truck and trailer embodying my invention.
Fig. 2 is a side elevation upon an enlarged scale, of the rear end of the towing vehicle and the forward truck of the trailer. In this view the rear end of the frame of the vehicle is broken away and shown partially in section, and a portion of the wheels of the forward truck are broken away so as to show the axle in section.

In Fig. 1 I illustrate a trailer body 1, which carries at its forward end a forward truck 2 connected with the under side of the body, through a fifth wheel connection including a fifth wheel 3. This truck 2 is mounted on wheels 4, which may be dual wheels at each side if heavy loads are to be used. The trailer can be drawn along by means of a power-driven vehicle 5, having a rearwardly extending chassis 6 supported on its own rear wheels 7. This vehicle frame 6 is provided with a fifth wheel 8. Over this fifth wheel 8 the forward extension or bill 9 of the truck 2 extends. In coupling the vehicle to the bill 9 of the forward truck, the vehicle is backed under the bill 9 so that the forward end of the bill engages the cam faces 10 so as to guide the locking mechanism on the truck 2 in a position to lock itself on the king pin 11 of the fifth wheel 8. Such locking mechanism usually includes two jaws 12 indicated in dotted lines in Fig. 2, that automatically spread apart, and which have sockets on their adjacent faces to engage the pin. Locking mechanisms for this purpose are quite common, and function in this general manner. If the vehicle 5 has been coupled to the forward truck 2 of the trailer, the truck 2 can of course swing laterally in the roadway, on the vertical axis indicated by the line 13 passing through the king pin of the fifth wheel 8.

In accordance with my invention, I provide means for inhibiting the action of this forward fifth wheel 8. Although this could be accomplished theoretically by providing some lock located directly at the fifth wheel, in practice it is found that the forces dealt with are so great that almost any kind of a lock employed there, would break in operation. For this reason I prefer to locate the interlocking mechanism as far as possible from the axis of rotation, and for this reason I locate it at the rear end of the frame 6 of the vehicle. The mechanism that I prefer to employ for this purpose, is illustrated in Figs. 2 and 3 in detail, and preferably includes a transversely disposed yoke or cross-head 14, which is normally held in a forwardly disposed position when it is not in use. This yoke is guided on the frame 6, however, so that it can be projected toward the forward truck 2 of the trailer. For this purpose I may provide guide plates 15 at each side, which are engaged by guide fins 16 on the ends of the yoke. The inner edges of the guide plates 15 are received in the space between the spaced fins.

The yoke, or cross-head 14, is normally held in its retracted position by means of two return springs 17 in the form of coil springs, the rear ends of which are anchored in any suitable manner such as that indicated, and the forward ends of which are secured to a plate 18 that constitutes the shank of the yoke 14.

Any suitable means is employed for forcing the yoke 14 rearwardly at will, and this mechanism is preferably pneumatic, including a fluid-operated or pneumatic cylinder 19, the plunger 20 of which is connected by a pivot connection 21 to the shank 18. The forward end of the cylinder is anchored on a horizontal pivot 22 on the vehicle frame. This cylinder is controlled by the driver from the cab 23 of the vehicle, through a pneumatic hose 24 and a valve 25. In the present instance, this valve admits compressed air into the hose, that forces the piston of the cylinder toward the rear. In the medial fore-and-aft line the yoke or cross-head 14 is provided with a notch 26, which operates to interlock with a part on the truck 2.

In order to cooperate with this notch 26, the adjacent portion of the truck 2 is provided with a bracket 27, which includes an arc-shaped bow or quadrant 28, which is located in the medial fore-and-aft plane of the trailer, and this quadrant is struck on a radius having its center at the transverse rocking axis 29 on which the fifth wheel 8 is supported. The rear edges 30 of the yoke 14 are preferably inclined forwardly toward the sides. This enables these edges to cooperate with the quadrant 28 if the notch 26 is not exactly in line with the quadrant 28 when the locking mechanism is operated. In that case, one of the edges 30 will project itself against the quadrant 28 and be held yieldingly against it by the compressed air in the cylinder 19. As soon as the power-driven vehicle 5 moves forwardly, the quadrant 28 will align itself with the notch 26, whereupon the yoke 14 will move an additional amount toward the rear so as to seat the socket 26 against the quadrant.

Although the socket 26 could be a fixed socket in the yoke, I prefer to employ a grooved pulley 31 mounted at the middle of the yoke for rotation on a horizontal pin 32. The groove in this pulley forms the socket 26. The advantage of using a pulley or roller at this point, is that it will roll substantially without friction along the arc of the quadrant 28 as the truck 2 rises and falls when moving along the roadway, with relation to the position of the wheels 7 of the vehicle.

In order to enable the forward truck 2 of the trailer to be supported in an upright position, and to take strains off of the fifth wheel 3 when the vehicle has left the trailer body 1 at any point of delivery, I prefer to form the bracket 27 with an elongated guide 33 for an adjustable post or "jack" 34. This post has a foot 35 at its lower end to rest upon the ground, and may be held in this position by a cross-pin 36 passed through holes 37 in the guide. In Fig. 2 the pin 36 is mounted in an elevated position, holding the post 34 elevated, but by removing the pin the aligning hole in the post 34 can drop down into alignment with the holes 37, so that the pin can be placed in this lower position to hold the post 34 against rising in the guide.

In Figs. 4 and 5, I illustrate another embodiment of interlocking means for interlocking the rear end of the vehicle to the forward truck of the trailer. In this view 2a indicates the trailer truck. In this case I provide a transverse shaft 38 under the rear end of the vehicle frame 6a, and this shaft operates as a rock shaft carrying two cam arms 39. These cam arms are normally disposed in a forward position out of the path of the truck 2a in swinging laterally on the roadway. However, by supplying compressed air to the air cylinder 40, the short arm 41 on the shaft 38, operates to swing the cam arms 39 downwardly and toward the rear. Their cam faces, 39a, which are on their inner sides, will then engage the side faces of the truck 2a and hold the same against lateral movement. A pin and slot connection can be used between the rear end of the plunger 42 of the air cylinder 40, and the short arm 41, if the cylinder 40 is rigidly mounted in the frame or, if desired, the forward end of the cylinder can be mounted on a pivot pin, in the manner illustrated in Fig. 2.

Figure 8:
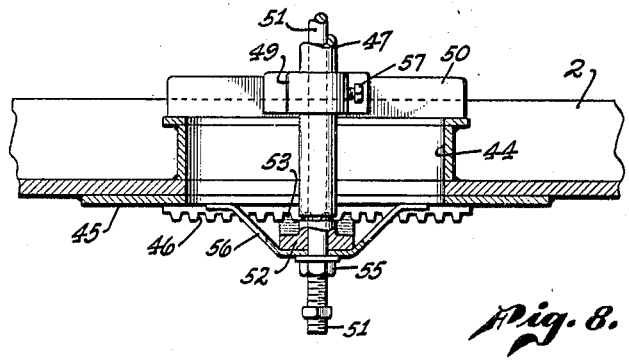
Fig. 8 is a horizontal section taken about on the line 8—8 of Fig. 7, and further illustrating details of the adjusting and locking means for the rear fifth wheel.
Figure 6:
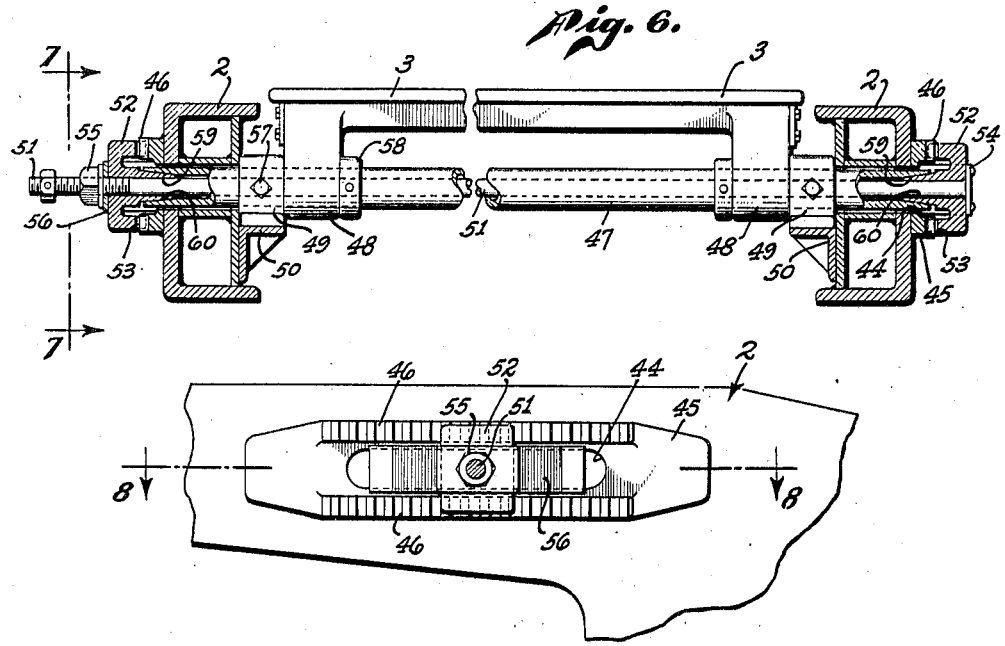
Fig. 6 is a vertical section taken about on the line 6—6 of Fig. 2, and particularly illustrating details of the mechanism for enabling the position of the rear fifth wheel to be adjusted in a fore-and-aft direction. In this view the middle portion of the structure is broken away.
Figure 7:
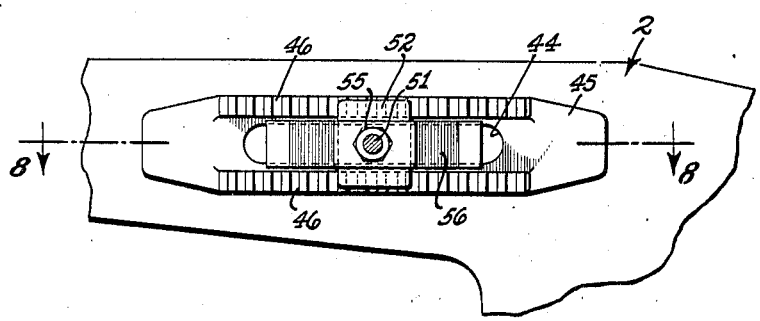
Fig. 7 is a vertical section taken on the line 7—7 of Fig. 6, adjacent one end of the adjusting mechanism for securing the rear fifth wheel in different adjusted positions, portions of the forward truck of the trailer being broken away.

The post 34 and guide 33 are preferably of considerable size and of square cross-section, as shown. These parts may be castings, the guide 33 being cast as an integral part of the bracket 37 and welded to the transverse frame plate 43 of the truck frame 2. The rear fifth wheel 3 is preferably mounted so that it is adjustable in a fore-and-aft direction, so as to distribute the load on the forward truck equally between the wheels 7 of the vehicle 6 and the wheels 4 of the forward truck of the trailer. The preferred construction for this purpose is illustrated in Figs. 6, 7 and 8. The side plates of the forward truck 2 are formed with longitudinal slots, such as the slot 44 shown in Fig. 7, and at this point the sides of the truck 2 are provided with side plates 45 that are formed with two parallel racks 46, the teeth of which project outwardly. The fifth wheel 3 is mounted on a transverse tubular shaft 47 by means of integral bearing brackets 48, and this shaft is supported in bearings 49 which seat on short bars or angle brackets 50, extending in a front and rear direction. An inner shaft or tie bar 51 is provided, that lies within the tubular shaft 47. The ends of this inner shaft 51 extend beyond the ends of the tubular shaft (see Fig. 6) and carry a block or head 52 at each side, which heads are formed with rack teeth 53 to engage the teeth of the racks 46. The block 52 at one side of the frame of the truck 2, is secured to a head 54 formed on the inner shaft or spindle 51. A clamping nut 55 on the other end of the inner shaft 51, may be tightened up so as to force the teeth of the blocks 52 into engagement with the teeth of the racks. A flat spring or leaf spring 56 associated with the nut 55, exerts an outward pull on the nut, so that it would pull the head 54 in a direction to hold its block 52 in engagement with its corresponding racks 46.

By loosening up the nut 55, the inner spindle or shaft 51 can be pushed inwardly at the side where the nut 55 is located, so as to disengage the block 52 at the other side from its rack. The adjacent block 52 can be pulled outwardly, and the entire assembly consisting of the bearings 49, tubular shaft 47, and inner shaft 51, can then be slid as far as desired in a forward and rear direction, and then re-clamped in position.

The bearings 49 merely operate as supports for the outer shaft 47, and the outer shaft is clamped in these bearings by means of set screws 57. The bearing brackets 48 are loose on the outer shaft 47, and the outer shaft is held against shifting longitudinally by collars 58 seating against the inner faces of the bracket bearings 48.

Each end of the outer shaft 47, if desired, may have a conical seat 59 and each block 52 is then formed with a conical nose 60 to be received in this conical seat when the construction is tightened up. This assists in holding the outer shaft 47 rigidly in position.

In the operation of this truck and trailer apparatus, the locking yoke 14 is normally disposed in a forward position in which it is yieldingly held by the springs 17 (see Fig. 3). When it is desired to lock the forward fifth wheel 8, this is accomplished by opening the valve controlled by the valve lever 25 in the cab 23. The pneumatic cylinder 19 will then force the yoke 14 rearwardly, and if the notch 26 is in line with the quadrant 28, it will engage the quadrant and lock the forward truck 2 of the trailer against lateral swinging movement on the vertical axis of the forward fifth wheel 8. If the socket or notch 26 is not in line with the quadrant 28, nevertheless it will engage it as soon as these parts move in line with each other when the vehicle 6 moves forwardly.

As the truck wheels 4 move up and down, due to unevenness in the roadway, the roller 31 rolls up and down on the quadrant 28. This permits free rotation about the horizontal shaft or axis 29 that supports the under side of the fifth wheel 8.

In the embodiment illustrated in Fig. 4, by admitting compressed air to the cylinder 40 (see Fig. 4) the shaft 38 will be rocked in a clockwise direction, and cause the cam arms 39 to swing rearwardly and engage the sides of the truck 2a.

When the forward truck 2 is used as described, it will be evident that a very ample wheel support is provided for the trailer body 1. If dual wheels are provided on each side, the load will be distributed on eight wheels on each side.

By loosening up the nut 55, the adjustable mounting for the rear fifth wheel 3 can be loosened up and shifted in a fore-and-aft direction so as to equalize the weight on the wheels 7 and wheels 4.

In the semi-trailer type of truck illustrated in Figs. 1 and 3, my locking connection is preferably constructed so that it will limit the amount of angular swing of the intermediate truck on its fifth wheel connection to the chassis of the car or tractor. In order to accomplish this, I prefer to have the guides 15 project sufficiently to the rear to put them in the path of the quadrant 28, as indicated by the lines 28a in Fig. 3.

Figure 9:
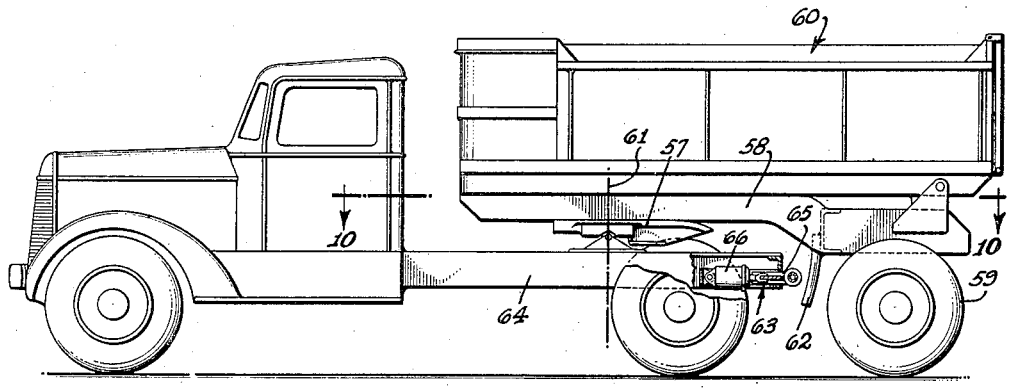
Fig. 9 is a side elevation of a truck of regular type, and illustrating my invention applied to the same, certain parts being broken away.
Figure 10:
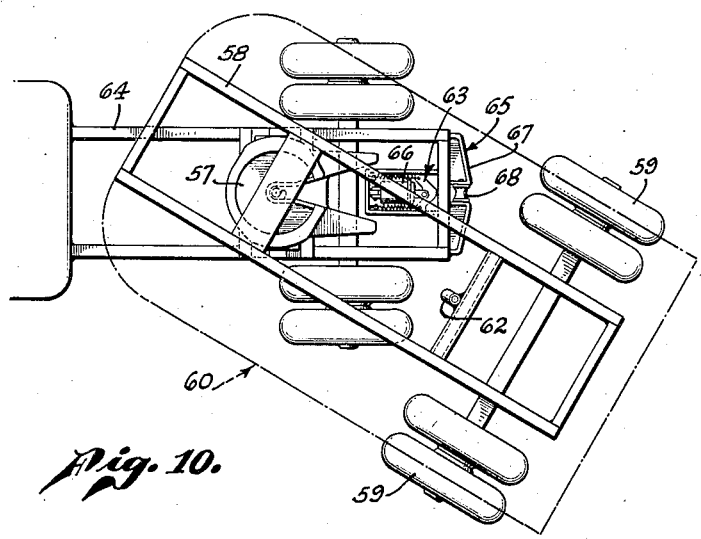
Fig. 10 is a plan of the truck shown in Fig. 9, and showing the truck body disposed at an angle as in turning; also illustrating how the truck can "jack knife" instead of backing properly.

In Figs. 9 and 10, I illustrate my invention as applied to a more common type of truck, in which there is only one fifth wheel indicated by the numeral 57 which, of course, corresponds to the fifth wheel 8 illustrated in Fig. 1. The truck 58, which carries the rear wheels 59 of the trailer or truck body 60, is attached to this fifth wheel and rotates on the axis of the fifth wheel indicated by the vertical line 61. The rear portion of the truck 58 is offset downwardly like the truck 2, and is provided with a quadrant or bow 62 to cooperate with locking mechanism 63. While it is obvious that the locking mechanism 63 and the quadrant 62 could be mounted on either one of the parts that are to be locked together, I prefer to mount the locking mechanism on the rear end of the frame or chassis 64 of the towing vehicle.

In this type of truck, however, I prefer to construct the cross head 65 so that the end guides 15 are omitted, thereby dispensing with their function as stops for limiting the swinging movement of the rear truck frame 58 on the axis of the fifth wheel. In other respects, however, the action of the locking mechanism 63 is substantially the same as that described in connection with Fig. 3.

Fig. 10 indicates the unlimited character of the swinging movement of which this construction is capable. In the operation of the locking mechanism 63, it should be understood that when its operating cylinder 66 is actuated, the cross-head or yoke 65 will move out to its extreme rear position, and this will project the inclined rear faces 67 of the cross-head into the path of the quadrant 62 when it swings into line. In other words, when the quadrant strikes against one of these inclined faces 67, it will push the cross-head 65 forwardly until the quadrant 62 eventually drops into the groove of the roller 68. This will, of course, lock the rear truck 58 to the chassis 64 and enable the truck to be backed straight toward the rear without any danger of "jack knifing."

Many other embodiments of the invention may be resorted to without departing from the spirit of the invention.

What I claim is:

1. In a truck and trailer apparatus, the combination of a power-driven vehicle having a frame, a fifth wheel mounted on the said frame toward the rear, a trailer having a body, a forward truck for the trailer body, a fifth wheel connection between the forward truck and the trailer body, said forward truck having a forward extension for connection to the first-named fifth wheel, a transverse yoke carried on the vehicle frame having a socket located on the medial fore and aft line of the vehicle, a quadrant located on the forward truck in a substantially vertical plane and also on the said fore-and-aft line, and means for effecting relative movement of the yoke and the quadrant in a fore-and-aft direction to engage the yoke with the quadrant, and to enable the quadrant to seat in the socket when aligned with the same and thereby lock the forward truck against lateral swinging movement on the axis of the first-named fifth wheel, said quadrant operating to maintain contact with the transverse yoke at the different levels that the yoke may assume when the power-driven vehicle and the forward truck of the trailer body are located on unlevel ground.

2. In a truck and trailer apparatus, the combination of a power-driven vehicle having a frame, a fifth wheel mounted on the said frame toward the rear, a trailer having a body, a forward truck for the trailer body, a fifth wheel connection between the forward truck and the trailer body, said forward truck having a forward extension for connection to the first-named fifth wheel, a transverse yoke carried on the vehicle frame having a socket located on the medial fore-and-aft line of the vehicle, a quadrant located on the forward truck in a substantially vertical plane and also on the said fore-and-aft line, and actuating means for yieldingly pressing the yoke against the quadrant while the forward truck is not aligned in the said fore and aft line, and so that the socket will engage with the quadrant when in line therewith, to lock the forward truck of the trailer against lateral movement on the axis of the first-named fifth wheel, said quadrant operating to maintain contact with the transverse yoke at the different levels that the yoke may assume when the power-driven vehicle and the forward truck of the trailer body are located on unlevel ground.

3. In a truck and trailer apparatus, the combination of a power-driven vehicle having a frame, a fifth wheel mounted on the said frame toward the rear, a trailer having a body, a forward truck for the trailer body, a fifth wheel connection between the forward truck and the trailer body, said forward truck having a forward extension for connection to the first-named fifth wheel, a transverse yoke carried on the vehicle frame having a socket located on the medial fore-and-aft line of the vehicle, a quadrant located on the forward truck in a substantially vertical plane and also on the said fore-and-aft line, actuating means for yieldingly pressing the yoke against the quadrant so that the socket will engage with the quadrant when in line therewith, to lock the forward truck of the trailer against lateral movement on the axis of the first-named fifth wheel, and a grooved roller mounted in the yoke positioned so that the groove of the roller forms the said socket to receive the quadrant.

4. In a truck and trailer apparatus, the combination of a power-driven vehicle having a frame, a fifth wheel mounted on the said frame toward the rear, a trailer having a body, a forward truck for the trailer body, a fifth wheel connection between the forward truck and the trailer body, said forward truck having a forward extension for connection to the first-named fifth wheel, a transverse yoke carried on the vehicle frame having a socket located on the medial fore-and-aft line of the vehicle, a quadrant located on the forward truck in a substantially vertical plane and also on the said fore-and-aft line, actuating means for yieldingly pressing the yoke against the quadrant when the socket is out of line with the quadrant so that the socket will engage with the quadrant when in line therewith, to lock the forward truck of the trailer against lateral movement on the axis of the first-named fifth wheel, and means for normally holding the yoke in a retracted position out of the path of the quadrant, said quadrant operating to maintain contact with the transverse yoke at the different levels that the yoke may assume when the power-driven vehicle and the forward truck of the trailer body are located on unlevel ground.

5. In a truck and trailer apparatus, the combination of a powder-driven vehicle having a frame, a fifth wheel mounted on the said frame toward the rear, a trailer having a body, a forward truck for the trailer body, a fifth wheel connection between the forward truck and the trailer body, said forward truck having a forward extension for connection to the first-named fifth wheel, a transverse yoke carried on the vehicle frame having a socket located on the medial fore and aft line of the vehicle, a quadrant located on the forward truck in a substantially vertical plane and also on the said fore and aft line, fluid pressure operated means on the vehicle frame for moving the yoke toward the quadrant and for maintaining the same in contact with the quadrant when the socket is out of line with the quadrant, to enable the quadrant to lodge in the socket when it comes into line therewith, said quadrant operating to maintain contact with the transverse yoke at the different levels that the yoke may assume when the power-driven vehicle and the forward truck of the trailer body are located on unlevel ground.

6. In a truck and trailer apparatus, the combination of a power-driven vehicle having a frame, a fifth wheel mounted on the said frame toward the rear, a trailer having a body, a forward truck for the trailer body, a fifth wheel connection between the forward truck and the trailer body, said forward truck having a forward extension for connection to the first-named fifth wheel, a transverse yoke guided to move in a fore-and-aft direction on the vehicle frame and having a socket, a bracket carried on the said forward truck substantially on the longitudinal axis of the truck having a quadrant, resilient means controlled at will for effecting movement of the yoke toward the quadrant, to interlock the socket and the quadrant when the same are in line, said bracket having a movable foot for supporting the forward truck on the ground when the vehicle is not connected to the trailer, said quadrant located in a substantially vertical plane and operating to maintain contact with the transverse yoke at any level that the yoke may assume when the power-driven vehicle and the forward truck of the trailer body are located on unlevel ground.

7. In a truck and trailer apparatus, the combination of a power-driven vehicle having a frame, a fifth wheel mounted on the said frame toward the rear to rock on a substantially horizontal transverse axis, a trailer having a body, a forward truck for the trailer body, a fifth wheel connection between the forward truck and the trailer body, said forward truck having a forward extension for connection to the first-named fifth wheel, said forward truck adjacent to the rear of said vehicle frame having a quadrant located in a substantially vertical plane and extending along an arc having said transverse axis as a center, and means mounted on the rear end of the vehicle frame for engaging said quadrant to lock the forward truck against lateral swinging movement on the first-named fifth wheel, said quadrant operating to maintain contact with said last-named means at different levels when the power-driven vehicle and the forward truck of of the trailer body are located on unlevel ground.

8. In a truck and trailer apparatus, the combination of a power-driven vehicle having a frame, a fifth wheel mounted on the said frame toward the rear, a trailer having a body, a forward truck for the trailer body, a fifth wheel connection between the forward truck and the trailer body, said forward truck having a forward extension for connection to the first-named fifth wheel, a transverse yoke carried on the vehicle frame having a socket located on the medial fore-and-aft line of the vehicle, a quadrant located on the forward truck in a substantially vertical plane and also on the said fore-and-aft line, actuating means for yieldingly pressing the yoke against the quadrant so that the socket will engage with the quadrant when in line therewith, to lock the forward truck of the trailer against lateral movement on the axis of the first-named fifth wheel, a grooved roller mounted in the yoke positioned so that the groove of the roller forms the said socket to receive the quadrant, and guiding means for guiding the ends of the transverse yoke projecting rearwardly and disposed in the path of the quadrant so as to limit the lateral swinging movement of the forward truck on the axis of the first-named fifth wheel.

9. In a truck and trailer apparatus, the combination of a trailer having a body, a forward truck under the trailer body having wheels located to the rear of the forward end of the body so as to leave an unobstructed space overhung by the body forward of the said truck wheels, a fifth wheel connection between the said forward truck and the trailer body, a power-driven towing vehicle having a frame with forward wheels and rear wheels, said towing vehicle capable of being backed into the said unobstructed space under the forward end of the trailer body so that the weight of the forward end of the trailer body can be supported on its own forward wheels and the rear wheels of the power-driven vehicle, a connectible fifth wheel connection between the forward end of said forward truck and the rear end of said power-driven vehicle located considerably forward of the rear wheels of the towing vehicle; and locking means adjacent the rear of the towing vehicle's frame for engaging directly with the frame of the forward truck to lock the frame of the power-driven vehicle to the same, and prevent movement of the forward truck on the axis of its fifth wheel connection to the frame of the said towing vehicle.

10. In a truck and trailer apparatus, the combination of a trailer having a body, a forward truck under the trailer body having wheels located to the rear of the forward end of the body so as to leave an unobstructed space overhung by the body forward of the said truck wheels, a fifth wheel connection between the said forward truck and the trailer body, a power-driven towing vehicle having a frame with forward wheels and rear wheels, said towing vehicle capable of being backed into the said unobstructed space under the forward end of the trailer body so that the weight of the forward end of the trailer body can be supported on its own forward wheels and the rear wheels of the power-driven vehicle, a connectible fifth wheel connection between the forward end of the trailer truck and the rear end of said power-driven vehicle, located considerably forward of the rear wheels of the towing vehicle; a locking member fixed to the forward end of the forward truck in the middle fore and aft plane of the same; and a transverse bar carried on the rear end of the towing vehicle's frame guided for movement in a fore and aft direction on the towing vehicle, said bar having means for interlocking with the fixed member to hold the same in the middle fore and aft plane of the towing vehicle.

11. A truck and trailer apparatus constructed as described in claim 10, in which the said locking member extends in a substantially vertical plane and presents a concave forward face to cooperate with the said transverse bar.

12. A truck and trailer apparatus constructed as described in claim 10, in which an adjustable connection is provided on the forward truck for adjusting its fifth wheel connection in a fore and aft direction to control the apportionment of the load between the rear wheels of the towing vehicle and the wheels of the forward truck, and with means on the rear end of the towing vehicle for moving the transverse bar rearwardly to engage the locking member.

AMOS H. KIRKSEY.